(12) United States Patent
Waller, Jr. et al.

(10) Patent No.: US 8,356,717 B2
(45) Date of Patent: Jan. 22, 2013

(54) HYDROPHILIC POROUS SUBSTRATES

(75) Inventors: Clinton P. Waller, Jr., White Bear Lake, MN (US); Douglas E. Weiss, Golden Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 367 days.

(21) Appl. No.: 12/678,297

(22) PCT Filed: Oct. 8, 2008

(86) PCT No.: PCT/US2008/079176
§ 371 (c)(1),
(2), (4) Date: Mar. 16, 2010

(87) PCT Pub. No.: WO2009/048933
PCT Pub. Date: Apr. 16, 2009

(65) Prior Publication Data
US 2010/0206806 A1    Aug. 19, 2010

(51) Int. Cl.
*B01D 71/78* (2006.01)
*B01D 71/82* (2006.01)
*B01D 71/44* (2006.01)
(52) U.S. Cl. .............. 210/500.35; 210/500.36
(58) Field of Classification Search ............ None
See application file for complete search history.

(56) References Cited

U.S. PATENT DOCUMENTS

| | | | |
|---|---|---|---|
| 4,157,418 A | 6/1979 | Heilmann | |
| 4,539,256 A | 9/1985 | Shipman | |
| 4,563,388 A | 1/1986 | Bonk et al. | |
| 4,726,989 A | 2/1988 | Mrozinski | |
| 4,867,881 A | 9/1989 | Kinzer | |
| 5,064,866 A | 11/1991 | Toyomoto et al. | |
| 5,075,342 A | 12/1991 | Ishigaki et al. | |
| 5,078,925 A | 1/1992 | Rolando et al. | |
| 5,120,594 A | 6/1992 | Mrozinski | |
| 5,180,492 A | 1/1993 | Ohnishi et al. | |
| 5,209,849 A | 5/1993 | Hu et al. | |
| 5,260,360 A | 11/1993 | Mrozinski et al. | |
| 5,336,698 A | 8/1994 | Kashiwagi et al. | |
| 5,350,805 A | 9/1994 | Lin | |
| 5,464,540 A * | 11/1995 | Friesen et al. | 210/640 |
| 5,503,746 A | 4/1996 | Gagnon | |
| 5,506,279 A | 4/1996 | Babu et al. | |
| 5,531,900 A | 7/1996 | Raghavan et al. | |
| 5,736,051 A | 4/1998 | Degen et al. | |
| 5,804,263 A | 9/1998 | Goldberg et al. | |
| 5,843,743 A | 12/1998 | Hubbell et al. | |

(Continued)

FOREIGN PATENT DOCUMENTS

EP    1 634 929    3/2006

(Continued)

OTHER PUBLICATIONS

Franken et al., "Wetting Criteria for the Applicability of Membrane Distillation", Journal of Membrane Science, (1987), pp. 315-328, vol. 33, Elsevier Science Publishers B.V.

(Continued)

*Primary Examiner* — Krishnan S Menon
(74) *Attorney, Agent, or Firm* — Kent S. Kokko

(57) ABSTRACT

Hydrophilic porous substrates, methods of making hydrophilic porous substrates from hydrophobic polymers are disclosed.

11 Claims, 1 Drawing Sheet

U.S. PATENT DOCUMENTS

| | | | |
|---|---|---|---|
| 5,902,836 | A | 5/1999 | Bennett et al. |
| 5,906,734 | A | 5/1999 | Girot et al. |
| 5,914,182 | A | 6/1999 | Drumheller |
| 5,962,544 | A | 10/1999 | Waller, Jr. |
| 6,245,922 | B1 | 6/2001 | Heilmann et al. |
| 6,280,853 | B1 | 8/2001 | Mickols |
| 6,287,730 | B1 | 9/2001 | Callahan et al. |
| 6,448,301 | B1 | 9/2002 | Gaddam et al. |
| 6,509,098 | B1 | 1/2003 | Merrill et al. |
| 6,632,518 | B1 | 10/2003 | Schmidt et al. |
| 6,669,994 | B2 | 12/2003 | Swan et al. |
| 6,670,427 | B1 | 12/2003 | Ulbricht et al. |
| 7,073,671 | B2 | 7/2006 | Charkoudian |
| 2003/0049671 | A1 | 3/2003 | Hillebrand et al. |
| 2003/0130462 | A1 | 7/2003 | Ulbricht et al. |
| 2004/0101442 | A1 | 5/2004 | Frechet et al. |
| 2004/0203149 | A1 | 10/2004 | Childs et al. |
| 2005/0058821 | A1 | 3/2005 | Smith et al. |
| 2005/0133441 | A1 | 6/2005 | Charkoudian |
| 2007/0015179 | A1 | 1/2007 | Klapperich et al. |
| 2007/0042015 | A1 | 2/2007 | Berry et al. |
| 2007/0154651 | A1 | 7/2007 | Weiss et al. |
| 2007/0154703 | A1 | 7/2007 | Waller et al. |
| 2008/0216942 | A1* | 9/2008 | Hiraoka et al. ............... 156/145 |
| 2009/0176052 | A1 | 7/2009 | Childs et al. |

FOREIGN PATENT DOCUMENTS

| | | |
|---|---|---|
| WO | WO 97/18904 | 5/1997 |
| WO | WO 00/11061 | 3/2000 |
| WO | WO 00/15686 | 3/2000 |
| WO | WO 00/22032 | 4/2000 |
| WO | WO 01/96487 | 12/2001 |
| WO | WO 03/008011 | 1/2003 |
| WO | WO 03/055611 | 7/2003 |
| WO | WO 2006/093865 | 9/2006 |
| WO | WO 2007/074494 | 7/2007 |

OTHER PUBLICATIONS

Saito et al., "Radiation-Induced Graft Polymerization is the Key to Develop High-Performance Functional Materials for Protein Purification", Radiation Physics and Chemistry, (1999), pp. 517-525, vol. 54, Elsevier Science Ltd.

Odian, "Principles of Polymerization", (1991), p. 275 and p. 481, 3$^{rd}$ Edition, John Wiley & Sons, Inc.

Wente, "Superfine Thermoplastic Fibers", Industrial and Engineering Chemistry, (Aug. 1956), pp. 1342-1346, vol. 48, No. 8, Naval Research Laboratory, Washington 25, D.C.

Wente et al., "Manufacture of Superfine Organic Fibers", Naval Research Laboratory Report 4364, (May 1954), pp. 1-15, Naval Research Laboratory, Washington D.C.

ASTM E-1275, "Standard Practice for Use of a Radiochromic Film Dosimetry System", pp. 714-718, West Conshohocken, PA, 1998.

Mika, et al., "Acid/base properties of poly(4-vinylpyridine) anchored within microporous membranes," Journal of Membrane Science, vol. 152, pp. 129-140, 1999.

Mika et al., "Chemical valves based on poly(4-vinylpyridine)-filled microporous membranes," Journal of Membrane Science, vol. 153, pp. 45-56, 1999.

Suryanarayan, et al., "The effect of gel layer thickness on the salt rejection performance of polyelectrolyte gel-filled nanofiltration membranes," Journal of Membrane Science, vol. 290, pp. 196-206, 2007.

Zhang, et al., "pH Control of Transport through a Porous Membrane Self-Assembled with a Poly(acrylic acid) Loop Brush," Langmuir, vol. 17, pp. 8336-8340, 2001.

Kavakli, et al., "Radiation-induced grafting of dimethylaminoethylmethacrylate onto PE/PP nonwoven fabric," Science Direct, Nuclear Instruments and Methods in Physics Research B, vol. 265, pp. 204-207, 2007.

Ulbricht, Mathias, "Advanced functional polymer membranes," Science Direct, Polymer, vol. 47, pp. 2217-2262, 2006.

Osada, et al., "Control of Water Permeability by Mechanochemical Contraction of Poly(Methacrylic Acid)-Grafted Membranes," Journal of Membrane Science, vol. 27, pp. 327-338, 1986.

Ito, et al., "pH-Sensitive Gating by Conformational Change of a Polypeptide Brush Grafted onto a Porous Polymer Membrane," Journal of the American Chemical Society, vol. 119, pp. 1619-1623, 1997.

Zhou, et al., "Pore-filled nanofiltration membranes based on poly(2-acrylamido-2-methylpropanesulfonic acid) gels," Science Direct, Journal of Membrane Science, vol. 254, pp. 89-99, 2005.

Mika, et al., "Salt separation and hydrodynamic permeability of a porous membrane filled with pH-sensitive gel," Journal of Membrane Science, vol. 206, pp. 19-30, 2002.

Kim et al., "Diffusion and Flow through Polymer-Lined Micropores," Ind. Eng. Chem. Res., vol. 30, pp. 1008-1016, 1991.

Winnik, et al., "Polyacrylic acid pore-filled microporous membranes and their use in membrane-mediated synethesis of nanocrystalline ferrihydrite," Can. J. Chem., vol. 76, pp. 10-17, 1998.

Ulbricht, et al., "Porous Polypropylene Membranes with Different Carboxyl Polymer Brush Layers for Reversible Protein Binding via Surface-Initiated Graft Coplymerization," Chemical Mater, vol. 17, No. 10, pp. 2622-2631, 2005.

Buehler, et al., "Solvent Effects on the Permeability of Membrane-Supported Gels," Ind. Eng. Chem. Res., vol. 41, No. 3, pp. 464-472, 2002.

Kanani, et al., "Separation of human plasma proteins HAS and HIgG using high-capacity macroporous gel-filled membranes," Biochemical Engineering Journal, vol. 35, pp. 295-300, 2007.

Mika, et al., "Poly(4-vinylpyridine)-filled microfiltration membranes: physicochemical properties and morphology," Journal of Membrane Science, vol. 136, pp. 221-232, 1997.

Mika, et al., "Porous, polyelectrolyte-filled membranes: Effect of cross-linking on flux and separation," Journal of Membrane Science, vol. 135, pp. 81-92, 1997.

Childs, et al., "Nanofiltration using pore-filled membranes: effect of polyelectrolyte composition on performance," Separation and Purification Technology, vol. 22-23, pp. 507-517, 2001.

Mika, et al., "A new class of polyelectrolyte-filled microfiltration membranes with environmentally controlled porosity," Journal of Membrane Science, vol. 108, pp. 37-56, 1995.

* cited by examiner

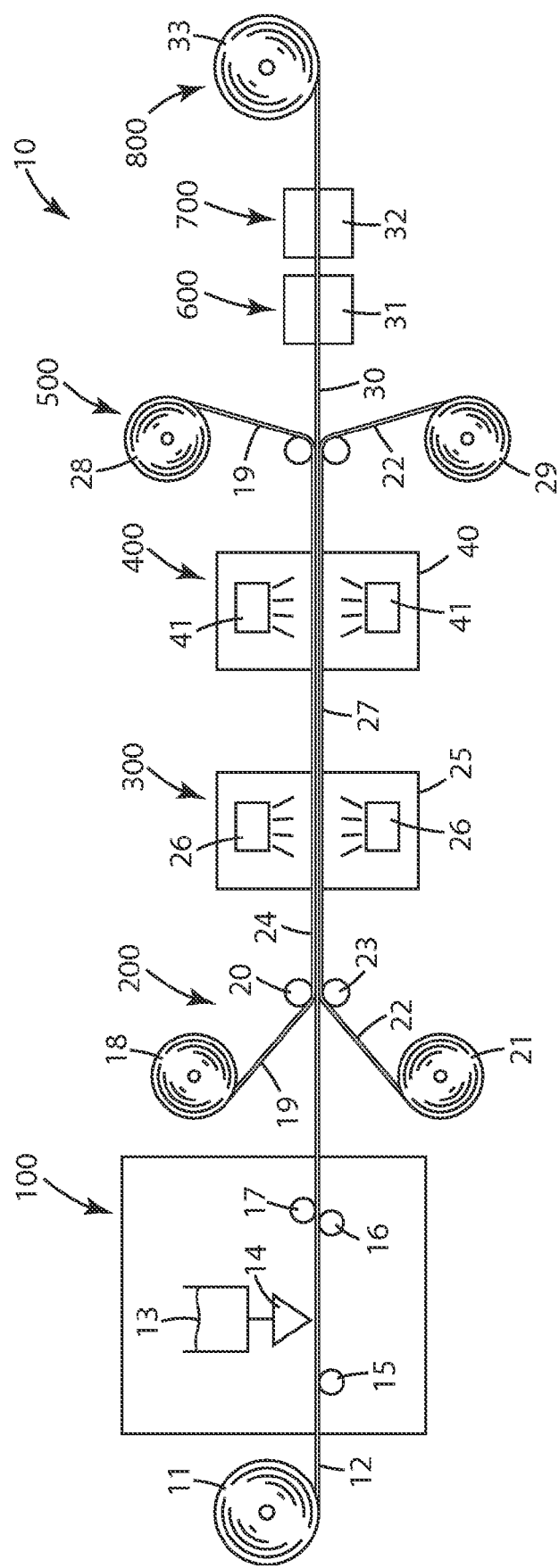

US 8,356,717 B2

HYDROPHILIC POROUS SUBSTRATES

CROSS REFERENCE TO RELATED APPLICATIONS

This application is a national stage filing under 35 U.S.C. §371 of PCT/US2008/79176, filed Oct. 8, 2008, which claims priority to U.S. application Ser. No. 11/870,828, filed Oct. 11, 2007, the disclosure of which is incorporated by reference in its/their entirety herein.

TECHNICAL FIELD

The present disclosure relates to hydrophilic, porous substrates, and methods for preparing the same.

BACKGROUND

There is a need in the art for porous polymeric substrates having enhanced hydrophilicity. Further, there is a need in the art for methods of making polymeric substrates having enhanced hydrophilicity from hydrophobic polymers.

SUMMARY OF THE INVENTION

The present invention is directed to hydrophilic substrates and methods of making hydrophilic substrates. More specifically, the hydrophilic substrates include a hydrophobic porous base substrate that has been modified to provide the requisite hydrophilicity.

Methods of making a hydrophilic substrate are provided. In some embodiments, the method comprises:

1) providing a porous base substrate having interstitial and outer surfaces;

2) imbibing the porous base substrate with a first solution to form an imbibed porous base substrate, the first solution comprising (a) at least one grafting monomer having an acrylate group and a photoinitiator group and (b) one or more monomers having at least one acrylate group and at least one additional ethylenically unsaturated, free-radically polymerizable group; and optionally (c) one or more additional monomers having at least one free-radically polymerizable group and a hydrophilic group; wherein at least one of (b) or (c) monomers are hydrophilic.

3) exposing the imbibed porous base substrate to a controlled amount of electron beam radiation so as to form a first functionalized substrate comprising grafted photoinitiator group attached to the surfaces of the porous base substrate, and 4) exposing the porous base substrate comprising grafted photoinitiator groups to a controlled amount of UV radiation to polymerize or crosslink the remaining ethylenically unsaturated, free-radically polymerizable groups.

An article is provided that comprises (a) a first grafted species comprising the reaction product of a monomer having an acrylate group and a photoinitiator group; and (b) a second species comprising the reaction product of a monomers having at least one acrylate group and at least one additional ethylenically unsaturated, free-radically polymerizable group and optionally (c) a third species comprising the reaction product of monomers having at least one ethylenically unsaturated, free-radically polymerizable group and a hydrophilic group, with the surfaces of the porous base substrate upon exposure to an electron beam and UV irradiation. At least one of (b) or (c) monomers is hydrophilic. Any free ethylenically unsaturated groups that remain ungrafted to the porous base substrate may crosslink upon subsequent exposure to UV radiation.

With respect to the method and article, all or a portion of the acrylate groups of the photoinitiator monomer (a) will be grafted to the surface of the porous base substrate upon e-beam irradiation. The unreacted photoinitiator monomers may be subsequently incorporated into the growing polymer chain on exposure to UV radiation. The remaining (b) and (c) monomers may be directly grafted to the surfaces (for example by grafting of an acrylate group), or indirectly grafted by incorporation into the growing polymer chain on exposure to UV radiation.

These and other features and advantages of the present invention will become apparent after a review of the following detailed description of the disclosed embodiments and the appended claims.

BRIEF DESCRIPTION OF THE DRAWINGS

FIG. 1 depicts exemplary method steps for making hydrophilic substrates of the present invention.

DETAILED DESCRIPTION OF THE INVENTION

In the article and methods of this invention, hydrophilic porous articles are provided by a two-step process of e-beam grafting of monomers and subsequent UV crosslinking of free, ungrafted ethylenically unsaturated polymerizable groups.

Compared to the porous base substrate before surface modification, the functionalized substrate typically has hydrophilicity. The hydrophilic porous substrate comprises a number of components including, but not limited to, (1) a porous base substrate having interstitial and outer surfaces and (2) the UV initiated reaction product of (a) a grafted photoinitiator group extending from the surfaces of the porous base substrate, (b) one or more monomers having at least one acrylate group and at least one additional free-radically polymerizable group; and optionally (c) one or more additional monomers having at least one free-radically polymerizable group and a hydrophilic group; wherein at least one of (b) or (c) monomers are hydrophilic.

Suitable porous base substrates include, but are not limited to, porous membranes, porous nonwoven webs, and porous fibers. The porous base substrate may be formed from any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates), copolymers of vinyl acetate, poly(phosphazenes), poly(vinyl esters), poly(vinyl ethers), poly(vinyl alcohols), and poly(carbonates).

Suitable polyolefins include, but are not limited to, poly(ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene).

Suitable fluorinated polymers include, but are not limited to, poly(vinyl fluoride), poly(vinylidene fluoride), copolymers of vinylidene fluoride (such as poly(vinylidene fluoride-co-hexafluoropropylene)), and copolymers of chlorotrifluoroethylene (such as poly(ethylene-co-chlorotrifluoroethylene).

Suitable polyamides include, but are not limited to, poly(imino(1-oxohexamethylene)), poly(iminoadipoyliminohexamethylene), poly(iminoadipoyliminodecamethylene), and polycaprolactam. Suitable polyimides include, but are not limited to, poly(pyromellitimide).

Suitable poly(ether sulfones) include, but are not limited to, poly(diphenylether sulfone) and poly(diphenylsulfone-co-diphenylene oxide sulfone).

Suitable copolymers of vinyl acetate include, but are not limited to, poly(ethylene-co-vinyl acetate) and such copolymers in which at least some of the acetate groups have been hydrolyzed to afford various poly(vinyl alcohols).

Preferably, the porous base substrate is formed from a propylene homo- or copolymers, most preferably propylene homopolymers. Polypropylene polymers are often a material of choice for porous articles, such as nonwovens and microporous films, due to properties such as non-toxicity, inertness, low cost, and the ease with which it can be extruded, molded, and formed into articles. However, polypropylene is hydrophobic. While it is desirable to render hydrophobic polymers such as polypropylene hydrophilic, polypropylene treated with ionizing radiation is subject to degradation, e.g., embrittlement, discoloration, and thermal sensitivity, during or subsequent to irradiation, which therefore limits the ability to render such thermoplastic polymers hydrophilic by e-beam grafting.

For radiation sensitive substrates, such as polypropylene, the present invention overcomes such polymer degradation by using a low dose of electron beam radiation to graft photoinitiator groups and optionally grafting other hydrophilic monomers on a portion of the surface, then polymerizing or crosslinking any ungrafted, unreacted ethylenically unsaturated groups by UV radiation.

In one exemplary embodiment, the porous base substrate comprises a microporous base substrate having an average pore size that is typically less than about 1.0 microns. Suitable microporous base substrates include, but are not limited to, microporous membranes, microporous nonwoven webs, and microporous fibers. The microporous base substrate is often initially hydrophobic and is rendered hydrophilic by the methods described herein.

In some embodiments, the porous base substrate is a microporous membrane such as a thermally-induced phase separation (TIPS) membrane. TIPS membranes are often prepared by forming a homogenous solution of a thermoplastic material and a second material above the melting point of the thermoplastic material. Upon cooling, the thermoplastic material crystallizes and phase separates from the second material. The crystallized thermoplastic material is often stretched. The second material is optionally removed either before or after stretching. Microporous membrane are further disclosed in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), U.S. Pat. No. 5,260,360 (Mrozinski et al.), and U.S. Pat. No. 5,962,544 (Waller), all of which are assigned to 3M Company (St. Paul, Minn.). Further, the microporous film can be prepared from ethylene-vinyl alcohol copolymers as described in U.S. Pat. No. 5,962,544 (Waller).

Some exemplary TIPS membrane comprise poly(vinylidene fluoride) (i.e., PVDF), polyolefins such as polyethylene homo- or copolymers or polypropylene homo- or copolymers, vinyl-containing polymers or copolymers such as ethylene-vinyl alcohol copolymers and butadiene-containing polymers or copolymers, and acrylate-containing polymers or copolymers. For some applications, a TIPS membrane comprising PVDF is particularly desirable. TIPS membranes comprising PVDF are further described in U.S. Patent Application Publication No. 2005/0058821, which is assigned to 3M Company (St. Paul, Minn.).

In other embodiments, the porous base substrate is a nonwoven web which may include nonwoven webs manufactured by any of the commonly known processes for producing nonwoven webs. As used herein, the term "nonwoven web" refers to a fabric that has a structure of individual fibers or filaments which are randomly and/or unidirectionally interlaid in a mat-like fashion.

For example, the fibrous nonwoven web can be made by carded, air laid, spunlaced, spunbonding or melt-blowing techniques or combinations thereof. Spunbonded fibers are typically small diameter fibers that are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to from a web of randomly disbursed meltblown fibers. Any of the non-woven webs may be made from a single type of fiber or two or more fibers that differ in the type of thermoplastic polymer and/or thickness.

Further details on the manufacturing method of non-woven webs of this invention may be found in Wente, Superfine Thermoplastic Fibers, 48 INDUS. ENG. CHEM. 1342 (1956), or in Wente et al., Manufacture Of Superfine Organic Fibers, (Naval Research Laboratories Report No. 4364, 1954).

The functionalized substrate has grafted species attached to the surfaces of the porous base substrate which includes (a) at least one photoinitiator group (or the reaction product thereof), (b) at least one ethylenically unsaturated group (or the reaction product thereof) and (c) optionally other hydrophilic groups, wherein at least one of (b) or (c) is a hydrophilic group. The grafting of monomers to the surface of the porous base substrate results in a hydrophilic surface imparted to an otherwise hydrophobic base substrate. The hydrophilic monomer, whether "(b)" or "(c)", are used in amounts sufficient to render the porous substrate wettable as described herein.

The monomers that are grafted to the surface of the porous base substrates usually have both (a) an acrylate group for grafting by e-beam and (b) at least one additional function group thereon, which includes (a) a photoinitiator group to initiate the crosslinking on exposure to UV radiation, (b) an acrylate or a non-acrylate, free-radically polymerizable ethylenically unsaturated group for subsequent crosslinking and optionally (c) a hydrophilic group.

Acrylate groups are preferred for direct grafting of the monomer to the porous substrate surface due to the greater reactivity of such acrylates on exposure to e-beam irradiation. However, not all such acrylate groups may be directly grafted (i.e. forming a covalent bond with the porous surface); some may remain free, and are subsequently "indirectly grafted" by incorporation into the polymer chain on exposure to UV radiation. Other ethylenically unsaturated groups, such as (meth)acrylamides, methacrylates, vinyl and vinyloxy groups, allyl and allyloxy groups, and acetylenic groups are less reactive during e-beam, and are less likely to be directly grafted to the porous base substrate. Therefore a portion of such non-acrylate groups may be directly grafted, but largely remain unreacted, and are indirectly grafted to the substrate by incorporation into the polymer chain during UV initiated polymerization.

The photoinitiator monomers may be directly grafted onto interstitial and outer surfaces of the porous base substrate to provide the requisite grafted photoinitiator group via the acrylate group. The "(b)" monomers, in addition to the acrylate group, the free-radically polymerizable groups of monomer (b) are typically other ethylenically unsaturated groups such as a (meth)acrylamides, methacrylates, vinyl groups and acetylenic groups having reduced reactivity during grafting, and are therefore free and unreacted for the subsequent UV initiated polymerization and crosslinking. The acrylate group of the "(b)" monomers typically can directly graft (i.e. forming a covalent bond) to the surface of the porous base substrate when exposed to an electron beam. That is, reaction of acrylate groups of the (b) monomers with the surface of the porous base substrate in the presence of the electron beam results in the formation of ethylenically unsaturated groups directly grafted to the porous base substrate via the acrylate group.

A third grafting monomer "(c)" may also be grafted via an acrylate group, and may provide hydrophilic groups to the surfaces of the porous base substrate. In other embodiments the third monomer may have an ethylenically unsaturated group of reduced reactivity during the grafting step, but is subsequently incorporated by free-radical polymerization during the UV curing step (indirectly grafted). At least one of the monomers (b) and (c) is a hydrophilic monomer.

The grafting photoinitiator monomers include an acrylate group and a photoinitiator group and may be represented by the generalized formula:

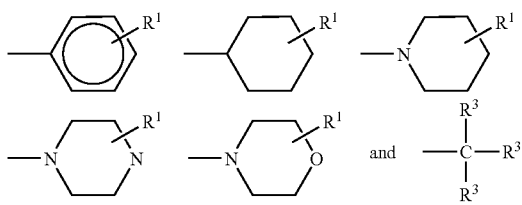

I where;
$R^4$ is a divalent linking group connecting the acrylate group with the PI group, and
PI is a photoinitiator represented by the structure:

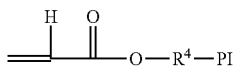

II wherein $R^2$ is

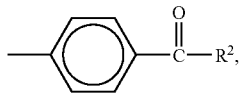

wherein $R^1$ is H or a $C_1$ to $C_4$ alkyl group,
each $R^3$ is independently a hydroxyl group, a phenyl group, a $C_1$ to $C_6$ alkyl group, or a $C_1$ to $C_6$ alkoxy group. Such photoinitiator monomers are described, for example, in U.S. Pat. No. 5,902,836 (Babu et al.) and U.S. Pat. No. 5,506,279 (Babu et al.). Further details regarding the linking $R^4$ group may be found with reference to the method of preparing the photoinitiator grafting monomer herein, and in the cited references.

In certain preferred embodiments, the photoinitiator monomers may be of the hydrogen-abstraction type represented by the general formula:

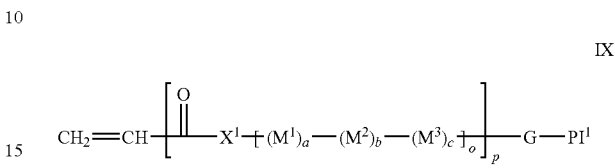

IX $X^1$ is O or NH;
p is 0 or 1;
o is 0 or an integer from 1 to 5;
a, b, and c are independently 0 or 1;
$M^1$ is $CH_2$ or $Si(R^1)_2$;
$M^2$ is $C(R^1)_2$ or $Si(R^1)_2$;
$M^3$ is —O—, —NH—, —C(O)—, —C(O)O—, —C(O)NH—, or —OC(O)NH—;
Each $R^1$ is independently H or a $C_1$ to $C_4$ alkyl group;
G is a covalent bond, —$(CH_2)_d$—, or —$(CH_2)_d$O— where d is an integer from 1 to 4, preferably from 1 to 2;
$PI^1$ is a radiation-sensitive hydrogen abstracting group having the general formula:

XIV in which Ar is a substituted arene having 6 to 12 carbon atoms, preferably a benzenetriyl group;
$R^{12}$ is hydrogen, a $C_1$ to $C_{12}$ alkyl group, a $C_1$ to $C_{12}$ alkoxy group, or a phenyl group; and
$R^{13}$ is a $C_1$ to $C_6$ alkyl group, a cycloalkyl group having 3 to 14 carbon atoms, or

wherein $R^{14}$ and $R^{15}$ are independently selected from hydrogen, $C_1$ to $C_{12}$ alkyl groups, $C_1$ to $C_{12}$ alkoxy groups, and phenyl groups.

Included among those hydrogen abstracting photoinitiator monomers encompassed by Formula IX are those where $PI^1$ is a moiety derived from one of the following compounds (or a substituted derivative thereof), the bond to G is preferably located para to the bridging carbonyl group: benzophenone, anthraquinone, 5,12-naphthacenequinone, aceanthracenequinone, benz(A)anthracene-7,12-dione, 1,4-chrysenequinone, 6,13-pentacenequinone, 5,7,12,14-pentacenetetrone, 9-fluorenone, anthrone, xanthone, thioxanthone, acridone, dibenzosuberone, acetophenone, and chromone. The synthesis of the formula XIII monomers is described in U.S. Pat. No. 5,773,485 (Bennett et al).

The weight percentage of the photoinitiator monomers in the imbibing solution can be at least about 0.01%, and preferably at least about 0.15%, and no more than about 2.5%, preferably no more than about 1%, relative to the total weight of other monomers (i.e. "(b)" and "(c)" monomers). It will be understood that all or a portion of the photoinitiator monomers may be directly grafted to the surfaces of the base substrate upon exposure to e-beam irradiation. Those unreacted, ungrafted photoinitiator monomers will be incorporated into the growing polymer chain on exposure to UV radiation, thereby indirectly grafting the monomers to the porous base substrate.

A variety of photoinitiator grafting monomers can be made by reacting 1) an acrylate monomer comprising a first reactive functional group with 2) a compound that comprises a radiation-sensitive group (photoinitiator group) and second reactive functional group, the two functional groups being co-reactive with each other. Preferred co-reactive compounds are ethylenically unsaturated aliphatic, cycloaliphatic, and aromatic compounds having up to 36 carbon atoms, optionally one or more oxygen and/or nitrogen atoms, and at least one reactive functional group. When the first and second functional groups react, they form a covalent bond and link the co-reactive compounds.

Examples of useful reactive functional groups include hydroxyl, amino, oxazolinyl, oxazolonyl, acetyl, acetonyl, carboxyl, isocyanato, epoxy, aziridinyl, acyl halide, and cyclic anhydride groups. Where the pendent reactive functional group is an isocyanato functional group, the co-reactive functional group preferably comprises a amino, carboxyl, or hydroxyl group. Where pendent reactive functional group comprises a hydroxyl group, the co-reactive functional group preferably comprises a carboxyl, isocyanato, epoxy, anhydride, acyl halide, or oxazolinyl group. Where the pendent reactive functional group comprises a carboxyl group, the co-reactive functional group preferably comprises a hydroxyl, amino, epoxy, vinyloxy, or oxazolinyl group.

Representative examples of acrylate compounds having a reactive functional group include hydroxyalkyl acrylates such as 2-hydroxyethyl acrylate and 2-(2-hydroxyethoxy) ethyl acrylate; aminoalkyl acrylates such as 3-aminopropyl acrylate; oxazolinyl compounds such as 2-ethenyl-1,3-oxazolin-5-one and 2-propenyl-4,4-dimethyl-1,3-oxazolin-5-one; carboxy-substituted compounds such as acrylic acid and 4-carboxybenzyl acrylate; isocyanato-substituted compounds such as isocyanatoethyl acrylate and 4-isocyanatocyclohexyl acrylate; epoxy-substituted compounds such as glycidyl acrylate; aziridinyl-substituted compounds such as N-acryloylaziridine; and acryloyl halides.

Representative examples of co-reactive compounds include functional group-substituted compounds such as 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy)phenyl]-2,2-dimethoxyethanone, and 1-[4-(carbomethoxy)phenyl]-2,2-dimethoxyethanone.

It will be understood that all or a portion of the acrylate groups of the photoinitiator monomer may be directly grafted to the surface of the porous substrate on exposure of e-beam irradiation. Those ungrafted, free acrylate groups may be subsequently indirectly grafted to the substrate by incorporation into the polymer chain on UV initiated polymerization.

The second grafting monomers comprises (a) one or more acrylate groups for grafting and (b) one or more second, ethylenically unsaturated, free-radically polymerizable groups for subsequent crosslinking. The second ethylenically unsaturated group may be an acrylate or a non-acrylate; i.e. other ethylenically unsaturated groups having reduced reactivity relative to the acrylate group during the e-beam grafting step. Preferably the second ethylenically unsaturated group is a non-acrylate group and is left largely free and unreacted during the grafting step for subsequent UV crosslinking. Useful second, non-acrylate ethylenically unsaturated groups include methacrylates, (meth)acrylamides, vinyl groups, vinyloxy, acetylenic groups, allyl and allyloxy groups.

Useful second grafting monomers may have the generalized structure:

$$[CH_2=CH-C(O)-O]_a-R^5-Q-Z_b, \qquad \text{III}$$

where Z is an acrylate or non-acrylate, ethylenically unsaturated polymerizable group,
Q is a divalent linking group selected from a covalent bond "—", —O—, —NR$^1$—, —CO$_2$— and —CONR$^1$—, where R$^1$ is H or $C_1$-$C_4$ alkyl; and
R$^5$ is an alkylene group of valence a+b, and optionally containing one or more catenary oxygen atoms and/or one or more hydroxyl groups; and a and b are each at least one. Preferably the Z group is a non-acrylate of reduced reactivity that is indirectly grafted into the polymer chain during UV initiated polymerization.

In certain embodiments, R$^5$ is a poly(alkylene oxide group) to provide the desired hydrophilicity, and is of the formula:

$$Z\text{-}Q\text{-}(CH(R^1)-CH_2-O)_n-C(O)-CH=CH_2, \qquad \text{IV}$$

wherein Z is an acrylate or non-acrylate, polymerizable ethylenically unsaturated group, R$^1$ is a H or a $C_1$ to $C_4$ alkyl group, and n is from 2 to 100, preferably 5 to 20, and Q is a divalent linking group selected from a covalent bond "—", —O—, —NR$^1$—, —CO$_2$— and —CONR$^1$—, where R$^1$ is H or $C_1$-$C_4$ alkyl. Preferably the Z group is a non-acrylate of reduced reactivity that is indirectly grafted into the polymer chain during UV initiated polymerization.

In one embodiment, the poly(alkylene oxide) group (depicted as —(CH(R$^1$)—CH$_2$-Q)$_n$-) is a poly(ethylene oxide) (co)polymer. In another embodiment, the pendent poly(alkylene oxide) group is a poly(ethylene oxide-co-propylene oxide) copolymer. Such copolymers may be block copolymers, random copolymers, or gradient copolymers.

Suitable monomers having a first acrylate group for grafting and a second ethylenically unsaturated group for subsequent UV crosslinking include, but are not limited to, polyalkylene glycol acrylate methacrylate including those derived from polyethylene glycol and polypropylene glycol acrylated monomers.

In another embodiment, the second monomer is a partially acrylated polyol, having at least one acrylate groups and at least one other ethylenically unsaturated polymerizable group, which is preferably not a acrylate group and may be selected from methacrylates, (meth)acrylamides, vinyl groups, vinyloxy, acetylenic groups, allyl and allyloxy groups. Such partially acrylated polyols may have one of more free hydroxyl groups.

Polyols useful in the present invention include aliphatic, cycloaliphatic, or alkanol-substituted arene polyols, or mixtures thereof having from about 2 to about 18 carbon atoms and two to five, preferably two to four hydroxyl groups.

Examples of useful polyols include 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethlene glycol, triethylene glycol, tetraethylene glycol, 2-ethyl-2-(hydroxymethyl)-1,3-propanediol, 2-ethyl-1,3-pentanediol, 1,4-cyclohexanedimethanol, 1,4-benzenedimethanol, and polyalkoxylated bisphenol A derivatives. Most preferably "(b)" monomers are those monoacrylates of glycerol having a free hydroxyl group and a methacrylate group such as 3-(acryloxy)-2-hydroxypropylmethacrylate).

In some preferred embodiments, the ethylenically unsaturated groups of the "(b)" and "(c)" monomers are chosen to be efficiently copolymerizable with each other. That is, it is preferred that each of the "(b)" and "(c)" monomers have the same ethylenically unsaturated groups.

In one exemplary embodiment, the grafted species result from the reaction of a polyethylene glycol acrylate monomer of Formulas III or IV with the porous base substrate upon exposure to an electron beam. These grafting monomers can be used to change a hydrophobic porous base substrate into a hydrophilic functionalized substrate due to the presence of the poly(alkylene oxide) group. The resulting hydrophilic can have a number of desired properties such as instant wettability following exposure to 1N NaOH for 20 hours as described in more detail below.

The optional third monomer ("(c)", hydrophilic monomer) comprises at least one acrylate or other non-acrylate, ethylenically unsaturated group of reduced reactivity, and a hydrophilic group, such as an ionic group, for providing hydrophilicity to the substrate. If the optional third monomer contains an acrylate group, it may be directly grafted to the surfaces of the porous bases substrate. If it contains a non-acrylate, ethylenically unsaturated group it will remain largely unreacted during the grafting step, and will be incorporated during the UV polymerization step. It will be understood that all or a portion of the acrylate groups may be directly grafted to the porous substrate, and a portion may be unreacted, but will be indirectly grafted into the polymer upon UV initiated irradiation. Conversely, a portion of other ethylenically unsaturated groups of reduced reactivity may be directly grafted, but such groups generally remain largely unreacted during the grafting step and are indirectly grafted into the polymer upon UV initiated irradiation.

The ionic groups may be neutral, have a positive charge, a negative charge, or a combination thereof. With some suitable ionic monomers, the ionic group can be neutral or charged depending on the pH conditions. This class of monomers is typically used to impart a desired hydrophilicity to the porous base substrate in addition to the second monomer.

In some preferred embodiments, the third monomer may have an acrylate group, or other ethylenically unsaturated groups of reduced reactivity, and a poly(alkylene oxide) group; e.g. monoacrylated poly(alkylene oxide) compounds, where the terminus is a hydroxy group, or an alkyl ether group.

In some embodiments the ionic monomers having a negative charge include (meth)acrylamidosulfonic acids of Formula II or salts thereof.

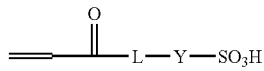

V wherein, Y is a straight or branched alkylene (e.g., an alkylenes having 1 to 10 carbon atoms, 1 to 6 carbon atoms, or 1 to 4 carbon atoms) and L is oxy or —$NR^1$—, where $R^1$ is H or $C_1$-$C_4$ alkyl-. Exemplary ionic monomers according to Formula I include, but are not limited to, N-acrylamidomethanesulfonic acid, 2-acrylamidoethanesulfonic acid, 2-acrylamido-2-methyl-1-propanesulfonic acid, and 2-methacrylamido-2-methyl-1-propanesulfonic acid. Salts of these acidic monomers can also be used. Counter ions for the salts can be, for example, ammonium ions, potassium ions, lithium ions, or sodium ions. It will be understood with respect to Formula V that the grafting acrylate group may be replaced by another ethylenically unsaturated group of reduced reactivity for subsequent incorporation (indirect grafting) during UV initiated polymerization.

Other suitable ionic grafting monomers having a negative charge include sulfonic acids such as vinylsulfonic acid and 4-styrenesulfonic acid; (meth)acrylamidophosphonic acids such as (meth)acrylamidoalkylphosphonic acids (e.g., 2-(meth)acrylamidoethylphosphonic acid and 3-(meth)acrylamidopropylphosphonic acid; acrylic acid and methacrylic acid; and carboxyalkyl(meth)acrylates such as 2-carboxyethyl(meth)acrylate, and 3-carboxypropyl(meth)acrylate. Still other suitable acidic monomers include (meth)acryloylamino acids, such as those described in U.S. Pat. No. 4,157,418 (Heilmann). Exemplary (meth)acryloylamino acids include, but are not limited to, N-acryloylglycine, N-acryloylaspartic acid, N-acryloyl-β-alanine, and 2-acrylamidoglycolic acid. Salts of any of these acidic monomers can also be used.

Some exemplary ionic grafting monomers that are capable of providing a positive charge are amino (meth)acrylates or amino (meth)acrylamides of Formula II or quaternary ammonium salts thereof. The counter ions of the quaternary ammonium salts are often halides, sulfates, phosphates, nitrates, and the like.

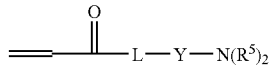

VI where L is oxy or —$NR^1$—, where $R^1$ is H or $C_1$-$C_4$ alkyl-; and Y is an alkylene (e.g., an alkylene having 1 to 10 carbon atoms, 1 to 6, or 1 to 4 carbon atoms). Each $R^5$ is independently hydrogen, alkyl, hydroxyalkyl (i.e., an alkyl substituted with a hydroxy), or aminoalkyl (i.e., an alkyl substituted with an amino). Alternatively, the two $R^5$ groups taken together with the nitrogen atom to which they are attached can form a heterocyclic group that is aromatic, partially unsaturated (i.e., unsaturated but not aromatic), or saturated, wherein the heterocyclic group can optionally be fused to a second ring that is aromatic (e.g., benzene), partially unsaturated (e.g., cyclohexene), or saturated (e.g., cyclohexane).

It will be understood with respect to Formula VI that the grafting acrylate group may be replaced by another ethylenically unsaturated group of reduced reactivity, such as methacrylate, (meth)acrylamide, vinyl, vinyloxy, ally, alloxy, and acetylenyl for subsequent incorporation (indirect grafting) during UV initiated polymerization.

In some embodiments of Formula VI, both $R^5$ groups are hydrogen. In other embodiments, one $R^5$ group is hydrogen and the other is an alkyl having 1 to 10, 1 to 6, or 1 to 4 carbon atoms. In still other embodiments, at least one of $R^5$ groups is a hydroxy alkyl or an amino alkyl that have 1 to 10, 1 to 6, or 1 to 4 carbon atoms with the hydroxy or amino group being positioned on any of the carbon atoms of the alkyl group. In yet other embodiments, the $R^5$ groups combine with the nitrogen atom to which they are attached to form a heterocyclic group. The heterocyclic group includes at least one nitrogen atom and can contain other heteroatoms such as oxygen or sulfur. Exemplary heterocyclic groups include, but are not limited to imidazolyl. The heterocyclic group can be fused to an additional ring such as a benzene, cyclohexene, or cyclohexane. Exemplary heterocyclic groups fused to an additional ring include, but are not limited to, benzoimidazolyl.

Exemplary amino acrylates (i.e., L in Formula VI is oxy) include N,N-dialkylaminoalkyl acrylates such as, for example, N,N-dimethylaminoethylacrylate, N,N-dimethylaminoethylacrylate, N,N-diethylaminoethyl acylate, N,N-diethylaminoethylacrylate, N,N-dimethylaminopropylacrylate, N,N-dimethylaminopropylacrylate, N-tert-butylaminopropylmethacrylate, N-tert-butylaminopropylacrylate and the like.

Exemplary amino (meth)acrylamides, that would be incorporated during the UV polymerization, (i.e., L in Formula VI is —$NR^1$—) include, for example, N-(3-aminopropyl)methacrylamide, N-(3-aminopropyl)acrylamide, N-[3-(dimethylamino)propyl]methacrylamide, N-(3-imidazolylpropyl)methacrylamide, N-(3-imidazolylpropyl)acrylamide, N-(2-imidazolylethyl)methacrylamide, N-(1,1-dimethyl-3-imidazoylpropyl)methacrylamide, N-(1,1-dimethyl-3-imidazoylpropyl)acrylamide, N-(3-benzoimidazolylpropyl)acrylamide, and N-(3-benzoimidazolylpropyl)methacrylamide.

Exemplary quaternary salts of the ionic monomers of Formula VI include, but are not limited to, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other monomers that can provide positively charged groups to an ion exchange resin include the dialkylaminoalkylamine adducts of alkenylazlactones (e.g., 2-(diethylamino)ethylamine, (2-aminoethyl)trimethylammonium chloride, and 3-(dimethylamino)propylamine adducts of vinyldimethylazlactone) and diallylamine monomers (e.g., diallylammonium chloride and diallyldimethylammonium chloride).

A third monomer, that may be incorporated by grafting or by subsequent UV polymerization are poly(alkylene oxide) monomers having at least one acrylate or non-acrylate ethylenically unsaturated group and a non-polymerizable terminus. Such monomers are of the general formula:

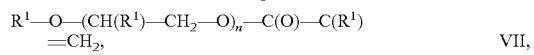

$$R^1-O-(CH(R^1)-CH_2-O)_n-C(O)-C(R^1)=CH_2, \quad \text{VII,}$$

wherein each $R^1$ is independently H or $C_1$-$C_4$ alkyl.

As described in further detail below, functionalized substrates of the present invention may be prepared using above-described monomers to provide hydrophilicity to the surface of a porous base substrate. When two or more of the above-described monomers are used to alter the surface properties of a porous base substrate, the monomers may be grafted onto the porous base substrate in a single reaction step (i.e., the two or more grafting monomers are all present upon exposure to an electron beam) or in sequential reaction steps (i.e., a first grafting photoinitiator monomer "(a)", and present upon a first exposure to an electron beam and a second grafting monomer "(b) and/or (c)" is present upon a second exposure to the electron beam). Similarly, all of such monomers (a), (b) and (c) may be present during a first grafting step and directly grafted, or indirectly grafted by incorporation during the subsequent UV initiated polymerization. Alternatively, all or a potion of such monomers may be imbibed in a first step, or in subsequent imbibing steps.

In some embodiments, the grafted species imparts a hydrophilic character to the functionalized substrate that contains a porous base substrate that has a hydrophobic character prior to surface modification. The hydrophilic character of the functionalized substrate results from the reaction of the porous base substrate with the "(b) and/or (c)" monomers that contain a hydrophilic group upon exposure to an electron beam and UV initiated polymerization.

As previously described, all or a portion of the photoinitiator a) monomers will be directly grafted to the substrate. Subsequently the additional b) and/or c) monomers may be indirectly grafted: the additional monomer may be grafted via the residue of the photoinitator and the base substrate. This may be illustrated with reference to Formula VIII where a hydrophilic c) monomer of Formula VII is indirectly grafter via the residue of a photoinitiator:

$$\text{—PI*—CH}_2\text{CH}-\overset{R^1}{\underset{|}{}}\overset{O}{\underset{\|}{C}}-(\text{OCH}_2\text{CH}(R^1))_n-OR^1, \quad \text{VIII}$$

wherein
each $R^1$ is independently H or $C_1$-$C_4$ alkyl;
n is from 2 to 100; and
PI* is the residue of a photoinitiator grafted to the substrate surface.

For example a grafting photoinitiator monomer such as 2-propenoylaminoethanoic acid; 2-(4-(2-hydroxy-2 methylpropanoyl)phenoxy)ethyl ester may be grafted to a substrate surface using ionizing radiation such as e-beam energy. In the presence of UV, the photoinitiator undergoes alpha cleavage to two radicals. In the presence of the ligand monomer, or other monomers, the radical may add to the ethylenically unsaturated group (such as the depicted acryloyl group) to indirectly graft the ligand monomer to the substrate surface via the residue of the photoinitiator as shown in formula I and illustrated in Scheme I below. It will be further understood that the radical addition product of the a), b) and/or c) monomers may further copolymerize with additional a), b) and/or c) monomers to produce a grafted polymer.

Scheme I

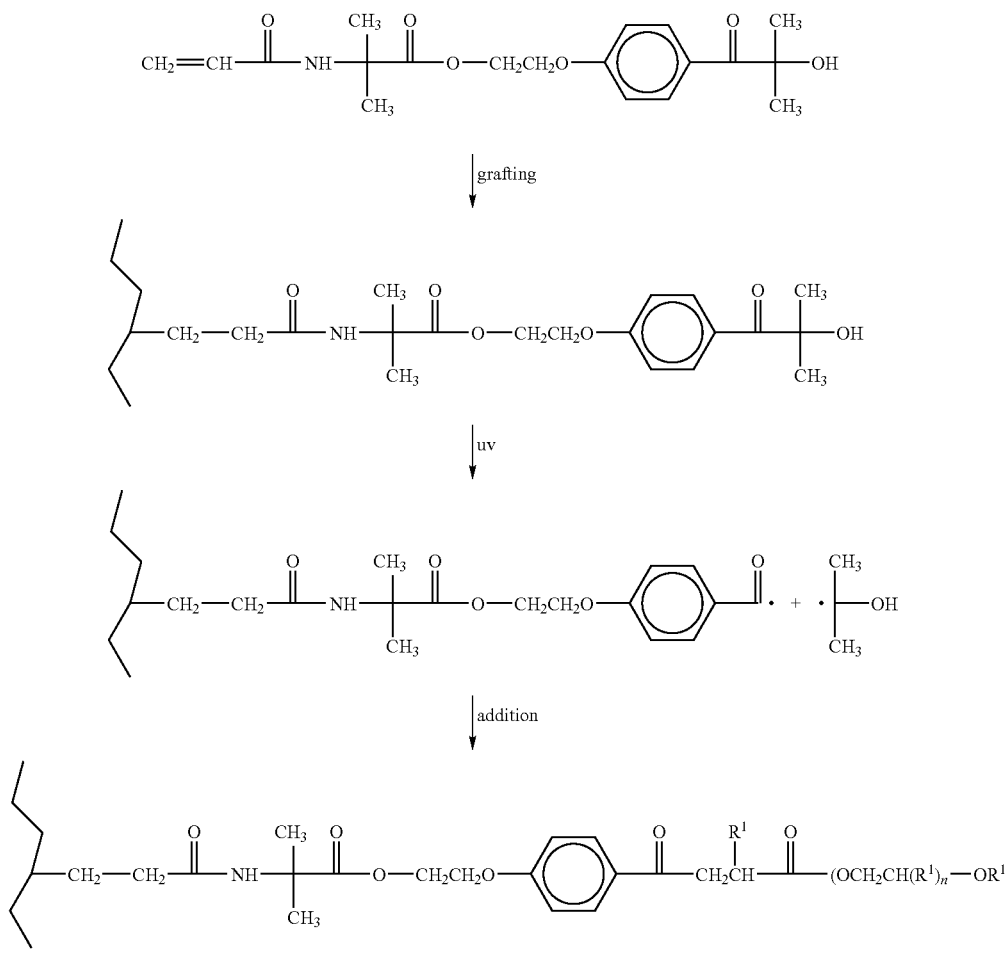

It will be further understood that the grafting process will yield a radical species, having a radical on the carbon alpha to the carbonyl of the hydrophilic monomer of Formula VII, that may further polymerize with one of more additional "b)" monomers, one of more photoinitiator "a)" monomers, one or more "c)" monomers, resulting in a grafted polymers having these groups pendent from the polymer chain as simply illustrated below. The formation of grafted polymer chains significantly increases the density of the desired ligand groups, and the efficiency of binding.

Substrate-$(M^{PI})$-$(M^b)_x$-$(M^c)_y$

In the formula, the -$(M^{PI})$- represent the residue of the grafted photoinitiator monomer (as illustrated in Scheme I), the -$(M^b)_x$ represents the polymerized b) monomer (such as in Formulas III or IV), having "x" polymerized monomer units, where x is at least one and preferably at least two, -$(M^c)_y$ represents the polymerized monomer "c)" (such as Formulas V to VII), having y polymerized monomer units, where y may be zero and is preferably at least 1. The polymer may be random or block, and the "b)" monomer, having two polymerizable groups may provide a crosslink between polymer chains. The polymer may be directly grafted via the residue of the photoinitiator, as shown in Scheme I, or may be directly grafted via the "b)" monomers or the "c)" monomers, as described herein. The polymer may further comprise polymerized photoinitiator monomer units from unreacted, ungrafted photoinitiator monomers.

The above-described hydrophilic substrates may be prepared using a combination of process steps. The method comprises:

1) providing a porous base substrate having interstitial and outer surfaces;

2) imbibing the porous base substrate with a solution to form an imbibed porous base substrate, the first solution comprising (a) at least one grafting monomer having an acrylate group and a photoinitiator group and optionally (b) one or more monomers having at least one acrylate group and at least one additional ethylenically unsaturated, free-radically polymerizable group; and optionally (c) one or more additional monomers having at least one ethylenically unsaturated, free-radically polymerizable group and a hydrophilic group; wherein at least one of (b) or (c) monomers are hydrophilic. The imbibing step may comprise a single solution or multiple solutions.

3) exposing the imbibed porous base substrate to a controlled amount of electron beam radiation so as to form a first functionalized substrate comprising grafted photoinitiator group attached to the surfaces of the porous base substrate, and 4) exposing the porous base substrate comprising grafted photoinitiator groups to a controlled amount of UV radiation to crosslink the remaining free-radically polymerizable groups.

With respect to the above-described method, the substrate may be imbibed with a first solution comprising the photoinitiator "a)" monomers and the "b)" monomers and optionally the "c)" monomers, subsequently exposed to the e-beam radiation and then crosslinked by UV radiation. Alternatively the method may comprise first imbibing the porous base substrate with the photoinitator "a)" monomer, exposing the imbibed substrate to e-beam radiation to graft the photoinitiator "a)" monomer to the surface of the substrate, subsequently imbibing the grafted porous base substrate with a second imbibing solution comprising the "b)" and optionally the "c)" monomers, then exposing the imbibed substrate to UV radiation to indirectly graft the "b)" and the "c)" monomers to the substrate.

Some of the porous base substrates used in this embodiment can be porous, microporous, nonwoven, or a combination thereof.

One exemplary method for making functionalized substrates is depicted in FIG. 1. As shown in FIG. 1, exemplary method 10 comprises the following steps: an imbibing step 100, a sandwiching step 200, an irradiation step 300, a UV initiated polymerization step 400, a peeling step 500, a wash/rinse step 600, a drying step 700, and a take-up step 800. Each of these exemplary steps is described in further detail below.

Methods of making functionalized substrates of the present invention may comprise one or more of the following steps.

Imbibing Step

As shown in FIG. 1, a roll 11 comprising a porous base substrate 12 may be unwound so that porous base substrate 12 enters into imbibing step 100. In imbibing step 100, porous base substrate 12 is brought into contact or into proximity with applicator 14 that is connected to a reservoir of solution 13 containing one or more grafting monomers. Rollers 15 and 16 guide porous base substrate 12 past applicator 14 so that porous base substrate 12 is exposed to solution 13 for a desired amount of time. Typically, the exposure time of the porous base substrate 12 to solution 13 is up to about 1.0 minutes, more typically, less than about 15 seconds. Porous base substrate 12 usually proceeds through imbibing step 100 and to irradiation step 300 in less than 1 minute. In some imbibing steps, the porous base substrate 12 is saturated with the solution 13.

As discussed above, solution 13 may comprise one or more grafting suitable for grafting onto interstitial and outer surfaces of porous base substrate 12. Any of the exemplary grafting monomers described above can be included in solution 13. In addition to grafting monomers, solution 13 can contain other materials such as, for example, one or more other non-grafting monomers for UV curing, and solvents. The concentration of each grafting monomer in solution 13 may vary depending on a number of factors including, but not limited to, the grafting monomer or monomers in solution 13, the extent of grafting desired, the reactivity of the grafting monomer(s), and the solvent used. Typically, the concentration of each monomer in solution 13 ranges from about 1 wt % to about 100 wt %, desirably, from about 5 wt % to about 30 wt %, and more desirably from about 10 wt % to about 20 wt % based on a total weight of solution 13.

Once porous base substrate 12 has been imbibed in solution 13 for a desired period of time, the porous base substrate 12 is directed toward sandwiching step 200 via guide roller 17. Guide roller 17 may be used to meter excess solution 13 from the imbibed porous base substrate 12 if so desired. Alternately, rollers (not shown) could be used to squeeze air bubbles and excess solution 13 from the imbibed porous base substrate 12. Typically, porous base substrate 12 enters sandwiching step 200 in a substantially saturated condition (i.e., porous base substrate 12 contains a maximum amount of solution 13 or close to a maximum amount) wherein substantially all of the interstitial and outer surfaces of porous base substrate 12 are coated with solution 13.

It should be noted that imbibing step 100 is only one possible method of introducing solution 13 into porous base substrate 12. Other suitable methods include, but are not limited to, a spray coating method, flood coating method, knife coating, etc.

Sandwiching Step

In sandwiching step 200, imbibed porous base substrate 12 is sandwiched (i.e., positioned) between a removable carrier layer 22 and a removable cover layer 19 to form multilayer sandwich structure 24. As shown in exemplary method 10, removable cover layer 19 may be unwound from roll 18 and brought into contact with an outer surface of imbibed porous base substrate 12 via roller 20, while removable carrier layer 22 may be unwound from roll 21 and brought into contact with an opposite outer surface of imbibed porous base substrate 12 via roller 23. Rollers 20 and 23 form a gap that may be used to regulate the amount of imbibing solution 13 imparted to the porous substrate.

Removable cover layer 19 and removable carrier layer 22 may comprise any inert sheet material that is capable of providing temporary protection to functionalized substrate 30 (i.e., grafted porous base substrate 12) from direct exposure to oxygen upon exiting chamber 25. Suitable inert sheet materials for forming removable cover layer 19 and removable carrier layer 22 include, but are not limited to, polyethylene terephthalate film material, other aromatic polymer film materials, and any other non-reactive polymer film material. In some embodiments, removable carrier layer 22 may be selected from materials that are transparent to UV radiation. Once assembled, multilayer sandwich structure 24 proceeds to irradiation step 300.

In irradiation step 300, multilayer sandwich structure 24 is exposed to a sufficient quantity of radiation so as to graft one or more monomers within solution 13 onto interstitial and outer surfaces of porous base substrate 12 so as to form multilayer sandwich structure 27 comprising functionalized substrate 30 sandwiched between removable carrier layer 22 and removable cover layer 19. As shown in exemplary method 10, multilayer sandwich structure 24 proceeds through chamber 25, which contains at least one device 26 capable of providing a sufficient dose of radiation. A single device 26 is capable of providing a sufficient dose of radiation, although two or more devices 26 may be used especially for relatively thick porous base substrates 12. Typically, chamber 25 comprises an inert atmosphere such as nitrogen, carbon dioxide, helium, argon, etc. with a minimal amount of oxygen, which is known to inhibit free-radical polymerization. In embodiments wherein porous base substrate 12 is irradiated without removable cover layer 19, the amount of oxygen within chamber 25 can be more of a concern. When removable carrier layer 22 and removable cover layer 19 cover the porous base substrate 12, exposure to oxygen within chamber 25 is minimal.

The irradiation step 300 provides the further advantage of converting any dissolved oxygen to peroxy compounds, which would interfere with the subsequent UV initiated polymerization. Therefore the e-beam irradiation step 300 facilitates the subsequent UV initiation 400 by the removal of oxygen.

Although other sources of irradiation may be used, desirably device 26 comprises an electron beam source. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 100 to 300 kilo-electron volts (keV), pass out of the vacuum chamber through the foil window and penetrate whatever material is positioned immediately beyond the foil window.

The quantity of electrons generated is directly related to the extractor grid voltage. As extractor grid voltage is increased, the quantities of electrons drawn from the tungsten wire filaments increase. E-beam processing can be extremely precise when under computer control, such that an exact dose and dose rate of electrons can be directed against multilayer sandwich structure 24.

Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

The temperature within chamber 25 is desirably maintained at an ambient temperature by conventional means. Without intending to be limited to any particular mechanism, it is believed that the exposure of the imbibed porous base substrate to an electron beam results in free radical initiation on the substrate which can then react with monomers having a double bond such as monomers having an ethylenically unsaturated group.

The total dose received by multilayer sandwich structure 24 primarily affects the extent to which the grafting monomer is grafted onto the porous base substrate. In general, it is desirable and typical to convert at least 10 wt %, desirably 20 wt %, even more desirably greater than 50 wt % of the grafting monomers added during the imbibing step to grafted species. Further, it is desirable and typical to graft as much as about 5 wt %, desirably as much as about 10 wt %, more desirably as much as about 20 wt % (or as much as about 100 wt %) of one or more grafting monomers added during the imbibing step onto porous base substrate 12, based on a total weight of porous base substrate 12. Dose is dependent upon a number of processing parameters, including voltage, speed and beam current. Dose can be conveniently regulated by controlling line speed (i.e., the speed with which multilayer sandwich structure 24 passes under device 26), and the current supplied to the extractor grid. A target dose (e.g., <10 kGy) can be conveniently calculated by multiplying an experimentally measured coefficient (a machine constant) by the beam current and dividing by the web speed to determine the exposure. The machine constant varies as a function of beam voltage.

While the controlled amount of electron beam radiation exposure is dependent upon the residence time, as a general matter, the monomers imbibed on the porous base substrate 12 that is part of multilayer sandwich structure 24 will generally be significantly grafted upon receiving a controlled amount of dosage ranging from a minimum dosage of about 1 kilograys (kGy) to a maximum dosage of less than about 50 kGy, depending on the particular polymer. For propylene polymers the amount typically ranges from a minimum dosage of about 1 kilograys (kGy) to a maximum dosage of less than about 10 kGy. Typically, the total controlled amount of dosage ranges from less than about 9 kGy to about 7 kGy for propylene polymers to avoid degradation. Less radiation sensitive polymers such as nylons or PVDF may be subjected to higher dosages, typically 10 to 70 kGy.

While low dose rates and longer residence times are preferred for radiation grafting, practical operation may necessitate speeds that force higher dose rates and shorter residence. Exclusion of oxygen in a multilayer sandwich allows free radical chemistry to continue after E-beam exposure for duration sufficient to improve the grafting yield. UV curing step In UV irradiation step 400, multilayer sandwich structure 24 is exposed to a sufficient quantity of ultraviolet radiation so as to initiate free radical polymerization from the grafted photoinitiator monomer and any free, unreacted acrylate groups and/or ethylenically unsaturated groups. The polymerization of the unreacted ethylenically unsaturated groups onto the grafted interstitial and outer surfaces of porous base substrate 12 forms multilayer sandwich structure 27 comprising functionalized substrate 30 sandwiched between removable carrier layer 22 and removable cover layer 19. As shown in exemplary method 10, multilayer sandwich structure 24 proceeds through chamber 40, which contains at least one device 41 capable of providing a sufficient dose of UV radiation. A single device 41 is capable of providing a sufficient dose of radiation, although two or more devices 41 may be used especially for relatively thick porous base substrates 12 or to double the lamp output. Upon UV irradiation, essentially all remaining acrylate and non-acrylate groups are incorporated into a polymer coating on the surfaces of the base substrate 12, rendering it hydrophilic Typically, chamber 40 comprises an inert atmosphere such as nitrogen, carbon dioxide, helium, argon, etc. with a minimal amount of oxygen, which is known to inhibit free-radical polymerization. In embodiments wherein porous base substrate 12 is irradiated without removable cover layer 19, the amount of oxygen within chamber 25 can be more of a concern. When removable carrier layer 22 and removable cover layer 19 cover the porous base substrate 12, exposure to oxygen within chamber 25 is minimal.

UV light sources can be of two types: 1) relatively low light intensity sources such as blacklights which provide generally 10 mW/cm$^2$ or less (as measured in accordance with procedures approved by the United States National Institute of Standards and Technology as, for example, with a UVI-MAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially crosslink the oligomer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

Peeling Step

Upon exiting chamber 25, multilayer sandwich structure 27 proceeds toward peeling step 500. In peeling step 500, multilayer sandwich structure 27 is disassembled by separating removable carrier layer 22 and removable cover layer 19 from functionalized substrate 30. As shown in exemplary method 10, removable cover layer 19 is separated from an outer surface of functionalized substrate 30 and taken-up as roll 28, while removable carrier layer 22 is separated from an opposite outer surface of functionalized substrate 30 and taken-up as roll 29.

In one desired embodiment, after exposure to an electron beam, UV curing, and exiting chamber 40, removable carrier layer 22 and removable cover layer 19 are allowed to remain on functionalized substrate 30 for a period of time prior to peeling step 400 so as to provide prolonged protection of functionalized substrate 30 from exposure to oxygen. Desirably, removable carrier layer 22 and removable cover layer 19 remain on functionalized substrate 30 for at least 15 seconds, more desirably, for about 30 to about 60 seconds after exiting chamber 25. However, there is no upper time limit that will reduce grafting quality and multilayer sandwich structure 27 can remain intact for an extended time period as would be the case if batch processing rolls of multilayer sandwich structure 27 are prepared. Once multilayer sandwich structure 27 is disassembled, functionalized substrate 30 can proceed to an optional washing/rinsing step 600.

In optional washing/rinsing step 600, functionalized substrate 30 is washed or rinsed one or more times in rinse chamber 31 to remove any unreacted monomers, solvent or other reaction by-products from functionalized substrate 30. Typically, functionalized substrate 30 is washed or rinsed up to three times using a water rinse, an alcohol rinse, a combination of water and alcohol rinses, and/or a solvent rinse (e.g., acetone, MEK, etc). When an alcohol rinse is used, the rinse may include one or more alcohols including, but not limited to, isopropanol, methanol, ethanol, or any other alcohol that is practical to use and an effective solvent for any residual monomer. In each rinse step, functionalized substrate 30 may pass through a rinse bath or a rinse spray.

In optional drying step 700, functionalized substrate 30 is dried to remove any rinse solution from functionalized substrate 30. Typically, functionalized substrate 30 is dried in oven 32 having a relatively low oven temperature for a desired period of time (referred to herein as "oven dwell time"). Oven temperatures typically range from about 60° C. to about 120° C., while oven dwell times typically range from about 120 to about 600 seconds. Any conventional oven may be used in optional drying step 700 of the present invention. Suitable ovens include, but are not limited to, a convection oven.

It should also be noted that in other embodiments drying step 700 can proceed before washing/rinsing step 600 eliminating volatile components before extraction of non-grafted residue.

Following optional drying step 700, dried hydrophilic substrate 30 can be taken up in roll form as roll 33 in step 800. Hydrophilic substrate 30 may be stored for future use in roll form, used immediately as is, or further processed to further alter the surface properties of hydrophilic substrate 30.

In one exemplary embodiment, hydrophilic substrate 30 is further processed to alter the surface properties of hydrophilic substrate 30. In this embodiment, functionalized substrate 30 is processed through a grafting process such as exemplary method 10 for a second time (or even more times) in order to (i) graft additional grafting monomers onto interstitial and outer surfaces of functionalized substrate 30, (ii) graft additional monomers onto grafted species extending from interstitial and outer surfaces of functionalized substrate 30, or (iii) both (i) and (ii).

For example, in one exemplary embodiment, functionalized substrate 30 is prepared by imbibing a porous base substrate with a first solution comprising one or more grafting monomers in a solvent, wherein the one or more grafting monomers comprise at least one grafting monomer having an acrylate group and a photoinitiator group thereon; and then exposing the porous base substrate imbibed with the first solution to a controlled amount of electron beam radiation so as to graft the photoinitiator monomers to interstitial and outer surfaces of the porous base substrate.

The resulting first functionalized substrate is rinsed to remove any unreacted grafting monomer, and may then subsequently imbibed with a second solution comprising one or more grafting monomers in a solvent, wherein the one or more grafting monomers comprise at least one grafting monomer having and acrylate group for grafting and at least one additional ethylenically unsaturated group for subsequent UV crosslinking; and then exposing the first functionalized substrate imbibed with the second solution to a controlled amount of electron beam radiation to form a second functionalized substrate having both photoinitiator groups and ethylenically unsaturated polymerizable groups.

The further modified functionalized substrate 30 can then proceed through an optional washing/rinsing step, such as exemplary washing/rinsing step 500 in exemplary method 10, and an optional drying step, such as exemplary drying step 600 in exemplary method 10. Subsequent to the two-step grafting process, the imbibed substrate can be further processed by the UV irradiation step.

In optional heating step (not shown), hydrophilic substrate 30 is heated. Typically, during the optional heating step, hydrophilic substrate 30 is subjected to an oven having an oven temperature of up to about 120° C. depending on a number of factors including, but not limited to, the reactants, the porous base substrate, the functional groups present on the grafted species, and the dwell time within oven 36. Typically, the oven temperature used in optional heating step is 30° C. of greater (desirably, 40° C. or greater, 50° C. or greater, or 60° C. or greater). The oven temperature typically ranges from about 60° C. to about 120° C. Typically, oven dwell time in optional heating step ranges from about 60 seconds to about 1 hour.

Any conventional oven may be used in the optional heating step of the present invention, such as optional heating step. Suitable ovens include, but are not limited to, the above-described ovens used in optional drying step 600 of exemplary method 10. Desirably, the oven used in optional heating step 800 of exemplary method 50 comprises a circulating air oven.

The hydrophilic substrate 33 may be stored for future use in roll form, used immediately as is, or further processed in one or more additional process steps (not shown). Suitable additional process steps may include, but are not limited to, a reaction step or a coating step wherein a coating composition is applied to further hydrophilic substrate 35, a lamination step wherein one or more additional layers are temporarily or permanently joined to further hydrophilic substrate 33, an assembling step wherein further hydrophilic substrate 33 is combined with one or more additional components to form a finished product (e.g., a filter assembly), a packaging step wherein further hydrophilic substrate 33 or a finished product comprising further hydrophilic substrate 33 is packaged within a desired packaging material (e.g., a polyethylene film or bag), or any combination thereof.

The methods of making functionalized substrates of the present invention may also be described by one or more process parameters including, but not limited to, the process parameters provided below.

1. Batch Versus Continuous Process

It should be noted that the methods of making functionalized substrates of the present invention may be performed using a continuous process, such as exemplary method 10 shown in FIG. 1, or alternatively, using a batch process wherein one or more of the above-described process steps are performed separate from one another. Desirably, the methods of making functionalized substrates are performed using a continuous process, such as exemplary method 10 shown in FIG. 1.

2. Line Tension

When using a continuous process, such as exemplary method 10, one or more drive rolls (not shown) may be used to move porous base substrate 12 or functionalized substrate 30 through the continuous process. The one or more drive rolls provide sufficient tension on porous base substrate 12 and functionalized substrate 30 to move porous base substrate 12 and functionalized substrate 30 through a given apparatus. Care should be taken when determining the amount of tension to apply in order to prevent shrinkage and/or tearing of porous base substrate 12 or functionalized substrate 30 during processing. If a stronger carrier web (e.g., removable carrier layer 22) is used to convey porous base substrate 12 or functionalized substrate 30, then the tension load is easier to adjust without transmitting the tension load through the substrate itself.

In the exemplary continuous grafting process of the present invention, the one or more drive rolls typically operate in a range of 5 to 40 lbs (22 to 178 Newtons) of tension on a (12 inch) 30 cm wide web of porous base substrate 12 or functionalized substrate 30 in order to move porous base substrate 12 or functionalized substrate 30 through a given apparatus, resulting in a tension of 0.7 to 5.9 Newtons per lineal centimeter of porous base substrate 12 or functionalized substrate 30. In one desired embodiment, the one or more drive rolls operate in a range of 1.4 to 3.0 Newtons per lineal centimeter of porous base substrate 12 or functionalized substrate 30.

3. Line Speed

In the exemplary continuous grafting process of the present invention, the one or more drive rolls also provide a desired line speed through a given apparatus. Desirably, porous base substrate 12 and functionalized substrate 30 move through a given apparatus at a line speed of at least about 1.52 meters/minute (mpm) (5 fpm). In one desired embodiment, porous base substrate 12 and functionalized substrate 30 move through a given apparatus at a line speed ranging from about 3.05 mpm (10 fpm) to about 30.5 mpm (100 fpm).

The disclosed methods of making functionalized substrate may be used to prepare a variety of hydrophilic substrates. The hydrophilic substrates have a polymerized coating derived from grafting followed by UV initiated polymerization from the grafted photoinitiator (a), the monomer having an ethylenically unsaturated group (b), and (c) optional other hydrophilic monomers that may be grafted or non-grafted.

In any of the above-described methods of making a functionalized substrate, any of the above-mentioned porous base substrates, grafting monomers, and reactants may be used to form a given functionalized substrate. The porous base substrate is often in the form of a porous membrane such as a microporous membrane, a nonwoven web, or porous fibers. In some embodiment, the porous base substrate comprises a hydrophobic microporous membrane formed by a thermally-induced phase separation (TIPS) method.

In one embodiment, the methods provide a porous article having a hydrophilic polymer coating on the surface thereof, the polymer coating comprising the UV polymerization reaction product of a grafted photoinitiator group and one or more ethylenically unsaturated polymerizable monomers, which may be ungrafted acrylate groups or other non-acrylate ethylenically unsaturated polymerizable groups. In another embodiment, the methods provide a porous article having a hydrophilic polymer coating on the surface thereof, the polymer coating comprising the UV polymerization reaction product of a grafted photoinitiator group, a grafted monomer having and one or more non-acrylate ethylenically unsaturated polymerizable groups, and one or more ethylenically unsaturated polymerizable monomers.

The method of making a hydrophilic substrate alters the original hydrophobic nature of the porous base substrate, as the grafted and UV polymerized species include a hydrophilic group. In one embodiment, the grafting monomer having a first grafting acrylate group and a second non-grafting ethylenically unsaturated group may comprise a hydrophilic groups, as illustrated in Formula IV (supra).

For example, poly(alkylene oxide) compounds of Formula IV can be used to impart a hydrophilic character to a hydrophobic porous base substrate. These grafting monomers have an acrylate group, a non-acrylate ethylenically unsaturated group and a hydrophilic polyalkylene glycol (i.e., polyalkylene oxide) group. Alternatively grafting monomers of Formula II may be used which do not contain the hydrophilic polyalkylene glycol (i.e. poly(alkylene oxide)) group. In these instances, hydrophilicity is imparted using a third monomer, which may contain a grafting acrylate group or a non-acrylate ethylenically unsaturated group, and a hydrophilic group, such as a quaternary ammonium group.

The present invention enables the formation of functionalized substrates having many of the advantages of a hydrophobic porous bases substrate (e.g., a hydrophobic microporous membrane), but with permanent hydrophilicity on the surfaces of the functionalized substrate. The present invention reduces or eliminates many of the known problems associated with porous bases substrates formed from hydrophilic polymers including, but not limited to, hygroexpansive issues; brittleness without humidification problems; mechanical strength weakness; and poor solvent, caustic and/or acidic resistance. The present invention also enables the formation of functionalized substrates having various degrees of hydrophilicity depending on the materials and steps used to form a given functionalized substrate.

The hydrophilic porous membranes are particularly suited as filter media, such as the filter media found in water filtration devices. As the polymer is grafted, either directly or indirectly, to render it hydrophilic, the filter media is durable. In many water filtration media, such as filter cartridges, the filter media is cleaned or sanitized by contact or flushing with aqueous NaOH. The hydrophilic porous substrate described herein, can be contacted or flushed with NaOH and retain the hydrophilic properties as evidenced by the surface energy and wettability.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Materials

"VAZPIA" refers to 2-propenoylaminoethanoic acid, 2-(4-(2-hydroxy-2 methylpropanoyl)phenoxy)ethyl ester prepared according to Example 1 of U.S. Pat. No. 5,506,279 (Babu et al.).

"PEG 400" Polyethyleneglycol, molecular weight 400, Aldrich Chemical Co.

"LUCIRIN TPO" is s 2,4,6-trimethylbenzoy diphenyl phosphine oxide, available from BASF, Charlotte, N.C.

Electron beam irradiation was carried out using a Model CB-300 electron beam system, obtained from Energy Sciences, Inc., Wilmington, Mass. The film samples were placed between two sheets of poly(ethylene terephthalate) film for the irradiation. The following procedure was adhered to unless otherwise specified. Samples of film were placed between two larger area size pieces of 4-mil thick PET and taped together at one end. This sandwich was then opened and the sample film was wetted with monomer solution and the sandwich reclosed. Trapped air bubbles were removed and excess liquid was squeezed out by gently applying a rubber roller over the surface of the sandwich. The sandwich was taped to a moving web of PET and conveyed through the electron beam processor at a speed of 20 fpm and at a voltage of 300 keV with sufficient beam current applied to the cathode to deliver the targeted dose. The beam was calibrated using thin film dosimeters, calibrated and traceable to a national standards laboratory (RISO, Denmark). In some cases, to lower the overall dose rate and increase residence time while under the beam, the dose was fractionated by multiple passes through the beam to simulate a longer exposure time more characteristic of electron beams with cathodes extended in the web direction (i.e. BroadBeam, etc).

Water Flux Test

Water flux was determined by placing a disk of the test film having a diameter of approximately 47 millimeters (1.85 inches) in a Model 4238 Pall Gelman magnetic filter holder (available from Pall Corp., East Hills, N.Y.). The filter holder was then placed on a filter flask that was attached to a vacuum pump. A vacuum gauge was used to monitor the vacuum. Approximately 150 milliliters of water was placed in the filter holder and then vacuum was applied. After approximately 50 milliliters of water passed through the film (the vacuum gauge at this time indicated approximately 0.83 millimeters of mercury (approximately 21 inches of mercury), timing was commenced using a stopwatch. When all of the remaining water had passed through the film, timing was stopped. The water flux was the time, measured in seconds, that elapsed for 100 milliliters of water to pass through the membrane under a vacuum of 0.83 millimeters of mercury.

Average Pore Diameter

The principle for determining average pore diameter is by allowing a wetting liquid to spontaneously fill the pores in the sample membrane and then using a non-reacting gas to displace the liquid from the pores of the membrane, where the gas pressure and flow rates are accurately measured. An Automated Capillary Flow Porometer, model number APP-1200-AEX with supplied software, Capwin version 6.71.54 from Porous Materials Inc. (PMI) of Ithaca N.Y. was used to obtain these values. Fluorinert FC-43 (available from 3M) was used as the wetting fluid and compressed nitrogen gas was used for displacement with a maximum pressure setting of 100 psi (689 kPa).

Penetrating Drop Method:

The surface energy of the samples was measured using. Dyne Test Solutions™ available from Jemmco LLC., Mequon Wis. 53092 (general test method disclosed in *Journal of Membrane Science*, 33 (1987) 315-328 Wetting Criteria For The Applicability of Membrane Distillation). A series of the test solutions of increasing surface tension are applied to the samples to until the solution beads up on the sample surface. The surface tension is then recorded.

The hydrophilic substrates of the present invention can exhibit various degrees of wettability upon exposure to various solutions or solvents. Wettability can often be correlated to the hydrophilic character of the hydrophilic substrate. As used herein, the term "instant wet" or "instant wettability" refers to the penetration of droplets of water into a given substrate as soon as the water contacts the substrate surface, typically within less than 1 second. For example, a surface wetting energy of about 72 dynes or larger usually results in instant wetting. As used herein, the term "no instant wet" refers to penetration of droplets of water into a given substrate but not as soon as the water contacts the substrate surface. As used herein, the term "no wetting" refers to the lack of penetration of droplets of water into a given substrate. For example, a surface wetting energy of about 60 dynes or less usually results in no wetting.

The hydrophilic substrates also exhibit resistance to multiple exposures to heat.

Example 1

A sample of a thermally induced phase separation (TIPS) microporous polypropylene film was prepared using the method described in U.S. Pat. No. 4,726,989 (Mrozinski). The TIPS film had the following properties: about 4.5 mils thick, Gurley (air flow) about 6 sec/50 cc air with an pore size range of about 0.44 0.8 microns, has a surface wetting energy of about 35 dynes (using JEMMCO LLC solutions for the penetrating drop method) and has a water flux of 25 sec (47 mm holder, 23 in Hg vacuum, IPA prewet). The sample was imbibed with a solution of 10% PEG 400 diacrylate with 0.5% VAZPIA (added to solids) in methanol. The samples were conveyed through the beam on a web carrier and were sandwiched 'wet' between layers of 4 mil PET in order to delay the diffusion of oxygen back into the membranes when they exited the beam chamber.

The sandwiched sample was irradiated by E-beam on an ESI CB-300 electron beam with a dose of 10 kGy set at a voltage of 300 keV. The samples (still sandwiched) were then UV irradiated with a Spectroline model SP-100P 365 nm light for 20 minutes.

Following UV irradiation, the grafted, crosslinked TIPS sample was soaked in a tray of water and exchanged three times with clean water to wash the sample. The sample was dried with an air gun with low heat and then heated to 60° C. for ½ hour in an oven. The resulting porous film sample was instantly wettable with water. As used herein, the term "instant wet" or "instant wettability" refers to the penetration of droplets of water into a given substrate as soon as the water contacts the substrate surface, typically within less than 1 second.

Comparative Example 2

This comparative example was prepared as in Example 1 except no VAZPIA was imbibed and the sample was not subsequently UV irradiated. The sample after drying and heating was not spontaneously wettable, indicating the TIPS sample was insufficiently grafted to render the film hydrophilic. Using the penetrating drop method for determining surface wetting energy, the surface wetting energy was now found to be about 56 dynes. The increase in surface wetting energy (relative to the starting TIPS sample) indicates some grafting to the membrane was initiated.

Example 3

This example was prepared as in Example 1 except the E-beam was 5 kGy. The sample, after drying and heating, was spontaneously wettable, indicating sufficient polymerization of the PEG 400 diacrylate (from UV cure and E-beam grafting) to render the film hydrophilic. Using water for the penetrating drop method for determining surface wetting energy (desired hydrophilicity) the surface wetting energy was found to be at or above 72 dynes.

Comparative Example 4

This comparative example was prepared as in Example 3 except no VAZPIA was imbibed and the sample was not subsequently UV irradiated. The sample after drying and heating was not spontaneously wettable or with vacuum (pressure) assistance, indicating insufficient grafting to render the film hydrophilic. Using the penetrating drop method for determining surface wetting energy, the surface wetting energy was found to be about 42 dynes. The increase in surface wetting energy (relative to the starting TIPS sample) indicates some grafting to the membrane was initiated.

Comparative Example 5

This comparative example was prepared as in Example 3 except no VAZPIA was imbibed, the sample was not subsequently UV irradiated and the sample was irradiated at 20 kGy instead of 11 kGy. The sample after drying and heating was spontaneously wettable, indicating sufficient grafting with the extra E-beam radiation to render the film hydrophilic. However, physical properties of the PP membrane are compromised—the strength was poor and would crumble after exposure to heat, indicating polymer chain degradation at the indicated e-beam dose.

Example 6

This example was prepared as in Example 1 except only 5% PEG400 diacrylate was used in the imbibing solution. The sample, after drying and heating, was not spontaneously wettable with water, but was wettable with vacuum (pressure) assistance, indicating insufficient grafting occurred to render the film instantly wettable.

Comparative Example 7

This comparative example was prepared as in Example 6 except no VAZPIA was imbibed and the sample was not subsequently UV irradiated. The sample after drying and heating was not spontaneously wettable or with vacuum (pressure) assistance, indicating insufficient grafting occurred to render the film hydrophilic.

Example 8

This example was prepared as in Example 1 except the sample was E-beam processed at about 0.75 Mrads and the imbibing solution contained 10% PEG 400 dimethacrylate, 2% 3-(Acryloxy)-2-hydroxypropylmethacrylate, and VAZPIA (at 0.42% to monomer weight). The sample after washing was dried by heating in a frame at 60° C. for ½ hour in an oven and was found to be spontaneously wettable. This indicates sufficient E-beam grafting and subsequent polymerization (from UV cure) to render the film hydrophilic.

Using water for the penetrating drop method for determining surface wetting energy (desired hydrophilicity), the surface wetting energy was found to be at or above 72 dynes. The bubble point pore size was slightly reduced to about 0.38 microns and had a water flux of about 30 seconds when coated and irradiated with the tight pore size up (bubble point of 0.36 microns and water flux of 43 seconds tight pore side down, (no IPA pre-wetting needed)). Two separate pieces of this sample were soaked in both 1N HCl and 1N NaOH at room temperature for 75 hours without a change in the film properties.

Comparative Example 9

This example was prepared as in Example 8 except no VAZPIA or 3-(Acryloxy)-2-hydroxypropylmethacrylate was added to the imbibing solution and the sample was not subsequently UV irradiated. The sample was dried at 55° C. for an hour on an Emerson Speed Dryer (Thwing Albert) Model 130. After drying, the porous film was not spontaneously wettable. The surface wetting energy was found to be 39 dynes. Despite the amount of hydrophilicizing monomer (PEG 400 dimethacrylate) used, grafting was insufficient to render the film hydrophilic because of the reduced reactivity of the methacrylate groups in the e-beam grafting step.

Comparative Example 10

This example was prepared as in Example 8 except the sample was irradiated at 20 kGy instead of 7.5 kGy, no VAZPIA or 3-(Acryloxy)-2-hydroxypropylmethacrylate was added to the coating solution, the sample was not subsequently UV irradiated and was dried on the Speed Dryer as in Example 9. After drying, the sample was not spontaneously wettable, indicating insufficient grafting to render the film hydrophilic, despite with the extra E-beam radiation, as the methacrylate groups are less reactive than the acrylate groups in the grating step (compare with Example 5). However, with the extra radiation, the surface wetting energy was found to be slightly better than Example 9, measured at 45 dynes.

Example 11

This example was prepared as in Example 8 (E-beam dose of 7.5 kGy) except the VAZPIA was added 1.0% to monomer weight. After washing, the sample was dried by heating in a frame at 60° C. for ½ hour in an oven and was found to be spontaneously wettable, indicating that after E-beam grafting there was sufficient polymerization (from UV cure) to render the film hydrophilic.

Using water for the penetrating drop method for determining surface wetting energy (desired hydrophilicity), the surface wetting energy was found to be at or above 72 dynes. The bubble point pore size was not reduced and remained at about 0.44 microns and had a water flux of about 25 seconds (coated and irradiated with the tight pore size down).

It is surmised that, during the UV cure, the larger amount of grafted VAZPIA generated more free radical initiation sites on the membrane substrate. This effectively limited the grafted chain length as the supply of monomer in solution was depleted, thereby reducing or eliminating pore plugging from the coating while still remaining very hydrophilic.

Example 12

This example was prepared as in Example 11 except the VAZPIA was added at 0.25% to monomer weight. The sample, after washing, was dried by heating it in a frame at 60° C. for ½ hour in an oven. The sample was not found to be spontaneously wettable, indicating that after E-beam grafting there was not a sufficiently high enough concentration of initiation sites for continued polymerization (from UV cure)

to render the film hydrophilic. Using JEMMCO LLC solutions for the penetrating drop method, the surface wetting energy was found to be about 64 dynes.

Example 13

This example was prepared as in Example 1 except the sample was not E-beam radiated. The imbibing solution contained 10% PEG400 dimethacrylate and 2% 3-(Acryloxy)-2-hydroxypropylmethacrylate, with 1.0% VAZPIA (to monomer weight) in methanol. After 20 minutes of UV cure, the sample, after washing and drying, was not spontaneously wettable, indicating polymerization from the UV cure alone was insufficient to render the film hydrophilic.

Example 14

This example was prepared as in Example 1 except the sample was not E-beam radiated. The imbibing solution contained 11.5% PEG400 dimethacrylate and 4% 3-(Acryloxy)-2-hydroxypropylmethacrylate, with 2.0% VAZPIA (to monomer weight) in methanol. After 4 minutes of UV cure with Quantum Technologies (Quant 48) UVA lamps, the sample, after washing and drying, was not spontaneously wettable, indicating polymerization from the higher intensity UV cure was insufficient to render the film hydrophilic.

Comparative Example 15

This example was prepared as in Example 1 except the sample was not E-beam radiated. The imbibing solution contained 11.5% PEG400 dimethacrylate and 4% 3-(Acryloxy)-2-hydroxypropylmethacrylate, with 1.0% Lucerin TPO to monomer weight (a non-grafting photoinitiator)) in methanol. After 4 minutes of UV cure with Quantum Technologies (Quant 48) UVA lamps, the sample, after washing and drying, was not spontaneously wettable. This indicates polymerization from the higher intensity UV cure in this system and more efficient photo initiator was not enough to make the film hydrophilic.

Example 16

This example was prepared as in Example 1 except the imbibing solution contained 10% PEG400 dimethacrylate, no 3-(Acryloxy)-2-hydroxypropylmethacrylate, with 1.0% VAZPIA (to monomer weight) in methanol. After E-beam and UV processing, washing and drying, the sample was not spontaneously wettable, indicating insufficient E-beam grafting or polymerization (from the UV cure) occurred to render the film hydrophilic.

Example 17

This example was prepared as in Example 1 except the imbibing solution contained 11.5% PEG400 dimethacrylate, 4% PEG400 diacrylate with 2.0% VAZPIA (to monomer weight) in methanol. After E-beam and UV processing, washing and drying, the sample was spontaneously wettable, indicating the E-beam grafting sufficiently modified the surface for polymerization from the UV cure to render the film hydrophilic. The significance of having a faster grafting acrylate or diacrylate in the coating formula is demonstrated.

Comparative Example 18

This example was prepared as in Example 1 except the imbibing solution contained 11.5% PEG400 dimethacrylate, and 1.4% Lucerin TPO (to monomer weight) in methanol. After E-beam and UV processing, washing and drying the sample was not spontaneously wettable, indicating the low dose E-beam grafting did not modify the surface enough for subsequent polymerization from the UV cure to make the film hydrophilic, in the absence of a grafting photoinitiator.

Example 19

This example was prepared as in Example 1 except the imbibing solution contained 12% acrylic acid, 4% 3-(acryloxy)-2-hydroxypropylmethacrylate with 2% VAZPIA (to monomer weight) in methanol. After E-beam and UV processing, washing and drying, the sample was spontaneously wettable, indicating the E-beam grafting modified the surface enough for polymerization from the UV cure to render the film hydrophilic.

Example 20

This example was prepared as in Example 1, except the imbibing solution contained 12% acrylic acid and 4% 3-(acryloxy)-2-hydroxypropylmethacrylate, with 2.0% VAZPIA (to monomer weight) in methanol. After E-beam and 4 minutes of UV cure with Quantum Technologies (Quant 48) UVA lamps, washing and drying, the sample was spontaneously wettable.

Example 21

This example was prepared as in Example 1 except the imbibing solution contained 12% N-vinyl pyrrolidone, 4% 3-(acryloxy)-2-hydroxypropylmethacrylate with 2% VAZPIA (added to solids) in methanol. After E-beam and UV processing, washing and drying, the sample was wettable, but not as complete as other samples.

Comparative Example 22

This example was prepared as in Example 1 except the sample was not E-beam radiated, and the imbibing solution contained 12% N-vinyl pyrrolidone and 4% 3-(Acryloxy)-2-hydroxypropylmethacrylate, with 2.0% VAZPIA (to monomer weight) in methanol. After 4 minutes of UV cure with Quantum Technologies (Quant 48) UVA lamps, washing and drying, the sample was not spontaneously wettable.

Example 23

A sample of TIPS porous polypropylene (PP) film was made using methods disclosed in U.S. Pat. No. 4,726,989 (Mrozinski), where the oil diluent was extracted before stretching. The porous membrane has a surface wetting energy of about 35 dynes measured using JEMMCO LLC solutions for the Penetrating Drop Method and has a water flux time of 46 sec (100 ml, 47 mm Gelman Magnetic Filter Funnel (4238), 21 inches Hg vacuum, IPA prewet).

The porous polypropylene TIPS sample was imbibed with a solution of 9% PEG 400 dimethacrylate, 2% 3-(acryloxy)-2-hydroxypropylmethacrylate with 1.0% VAZPIA photoinitiator (to monomer weight) in methanol. The PP membrane sample was sandwiched 'wet' between layers of 4 mil PET film with any excess solution squeezed out with a hand held rubber roller. The assembly was conveyed through the beam on a carrier web. (The PET covers delay the diffusion of oxygen back into the membranes when they exit the beam chamber.) The sandwiched assembly was irradiated by E-beam on an ESI CB-300 electron beam with a dose of 7.5 kGy set at a voltage of 300 keV. The samples (still sandwiched) were then UV irradiated with a Spectroline model SP-100P 365 nm light for 10 minutes on each side.

Following UV irradiation, the grafted, crosslinked PP sample was removed from the PET covers, soaked in a tray of water and that was exchanged three times with clean water to wash the sample. The sample was mounted on a frame and dried by heating to 60° C. for ½ hour in an oven. The resulting hydrophilic porous film sample was instantly wettable with a drop of water. The starting films average pore size was measured at 0.51 microns compared with the finished product's average pore size at 0.56 microns indicating no pore plugging occurred from the grafting process. (The very slight pore size expansion is well within experimental error and sampling film variations.)

The framed PP sample was steam autoclaved for three half hour cycles at 121° C. and found to be still instantly water wettable after exposure. A 47 mm disk was cutout and the flux time was essentially unchanged measuring 48 seconds. The grafted hydrophilic PP disk was then placed into a 40 ml vial and filled with 0.625 N NaOH and heated to 60° C. for 300 minutes. The sample was removed from the vial and thoroughly washed with water and dried. The sample was still instantly wettable with a drop of water.

What is claimed is:

1. A method of making a functionalized substrate, the method comprises the steps of:
    1) providing a porous base substrate having interstitial and outer surfaces;
    2) imbibing the porous base substrate with a first solution to form an imbibed porous base substrate, the first solution comprising (a) at least one grafting monomer having an acrylate group and a photoinitiator group and (b) one or more monomers having at least one acrylate group and at least one additional ethylenically unsaturated, free-radically polymerizable group; and optionally (c) one or more additional monomers having at least one ethylenically unsaturated, free-radically polymerizable group and a hydrophilic group;
    wherein at least one of (b) or (c) monomers are hydrophilic,
    3) exposing the imbibed porous base substrate to a controlled amount of electron beam radiation so as to form a first functionalized substrate comprising grafted photoinitiator group attached to the surfaces of the porous base substrate, and
    4) exposing the porous base substrate comprising grafted photoinitiator groups to a controlled amount of UV radiation to crosslink the remaining ethylenically unsaturated, free-radically polymerizable groups.

2. The method of claim 1, wherein the porous base substrate is microporous.

3. The method of claim 1, wherein the porous base substrate is selected from a porous membrane, porous non-woven web, or porous fiber.

4. The method of claim 1, wherein the monomer (b) comprises a poly(alkylene oxide) di(meth)acrylate.

5. The method of claim 1 wherein said monomers (b) having two or more free-radically polymerizable groups comprises a first acrylate group for grafting to said porous base substrate and a second methacrylate group for subsequent UV crosslinking.

6. The method of claim 1, wherein said first solution comprises (c) one or more additional monomers monomer having a free-radically polymerizable group and a hydrophilic group.

7. The method of claim 2, wherein the microporous base substrate is formed by a thermally-induced phase separation (TIPS) method.

8. The method of claim 7, wherein the microporous base substrate comprises propylene polymer membrane formed by a thermally-induced phase separation (TIPS) method.

9. The method of claim 1, wherein the controlled amount of electron beam radiation exposure comprises a dosage of less than 10 kGy.

10. A method of making a functionalized substrate, the method comprises the steps of:
    1) providing a porous base substrate having interstitial and outer surfaces;
    2) imbibing the porous base substrate with a first solution to form an imbibed porous base substrate, the first solution comprising (a) at least one grafting monomer having an acrylate group and a photoinitiator group and (b) one or more monomers having at least one acrylate group and at least one additional ethylenically unsaturated, free-radically polymerizable group; and optionally (c) one or more additional monomers monomer having at least one ethylenically unsaturated, free-radically polymerizable group and a hydrophilic group;
    wherein at least one of (b) or (c) monomers are hydrophilic,
    3) positioning the imbibed porous base substrate between a removable carrier layer and a removable cover layer to form a multilayer structure;
    4) exposing the multilayer structure to a controlled amount of electron beam radiation so as to form a functionalized substrate positioned between the removable carrier layer and the removable cover layer, the functionalized substrate comprising grafted photoinitiator groups attached to the surfaces of the porous base substrate;
    5) exposing the multilayer structure to UV radiation to initiate polymerization of the ungrafted ethylenically unsaturated groups; and
    6) removing the carrier layer and cover layers from the multilayer structure.

11. A method of making a functionalized substrate, the method comprises the steps of:
    1) providing a porous base substrate having interstitial and outer surfaces;
    2) imbibing the porous base substrate with a first solution to form an imbibed porous base substrate, the first solution comprising (a) at least one grafting monomer having an acrylate group and a photoinitiator group
    3) exposing the imbibed porous base substrate to a controlled amount of electron beam radiation so as to form a first functionalized substrate comprising grafted photoinitiator group attached to the surfaces of the porous base substrate, and
    4) imbibing the first functionalized substrate comprising grafted photoinitiator groups with a second imbibing solution comprising (b) one or more monomers having at least one acrylate group and at least one additional ethylenically unsaturated, free-radically polymerizable group; and optionally (c) one or more additional monomers having at least one ethylenically unsaturated, free-radically polymerizable group and a hydrophilic group;
    wherein at least one of (b) or (c) monomers are hydrophilic;
    5) exposing the imbibed porous base substrate comprising grafted photoinitiator groups to a controlled amount of UV radiation to crosslink the remaining ethylenically unsaturated, free-radically polymerizable groups.

* * * * *